K. VON KANDO.
OVERHEAD TROLLEY SYSTEM.
APPLICATION FILED MAY 4, 1908.
946,549.
Patented Jan. 18, 1910.
2 SHEETS—SHEET 1.
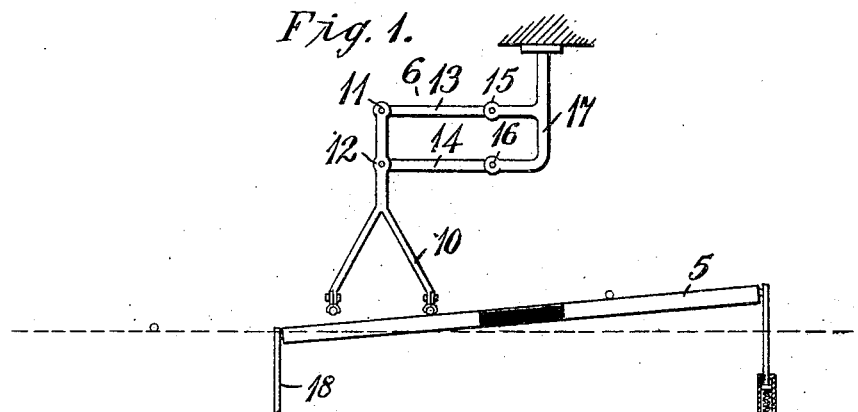
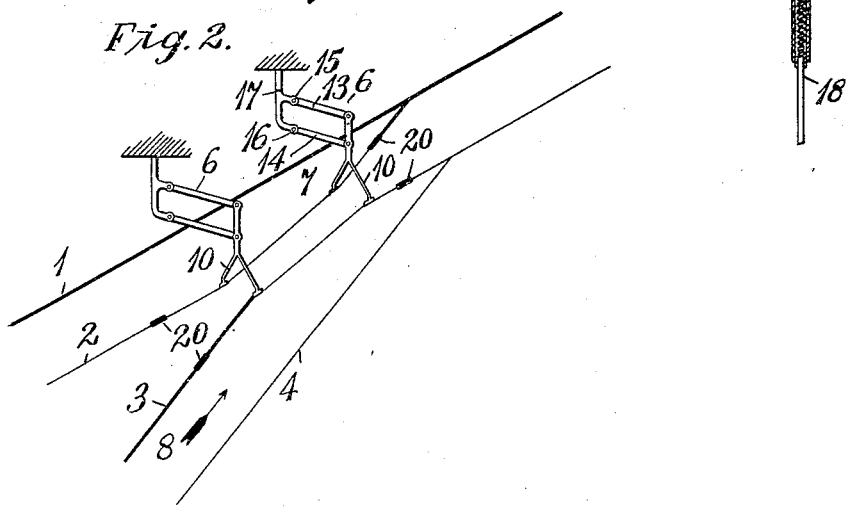
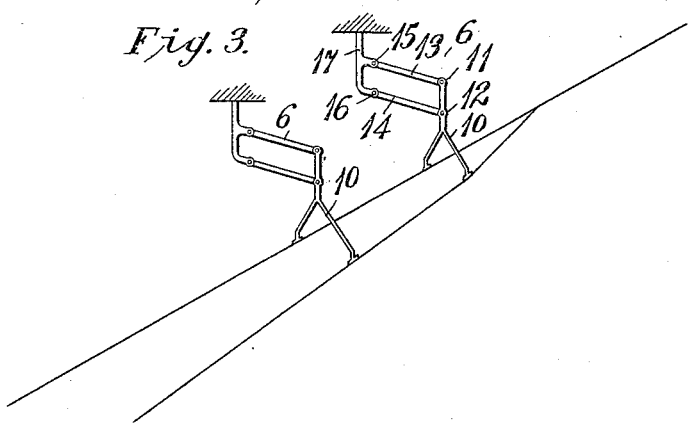
WITNESSES:
INVENTOR
Kalman von Kando
BY
ATTORNEY

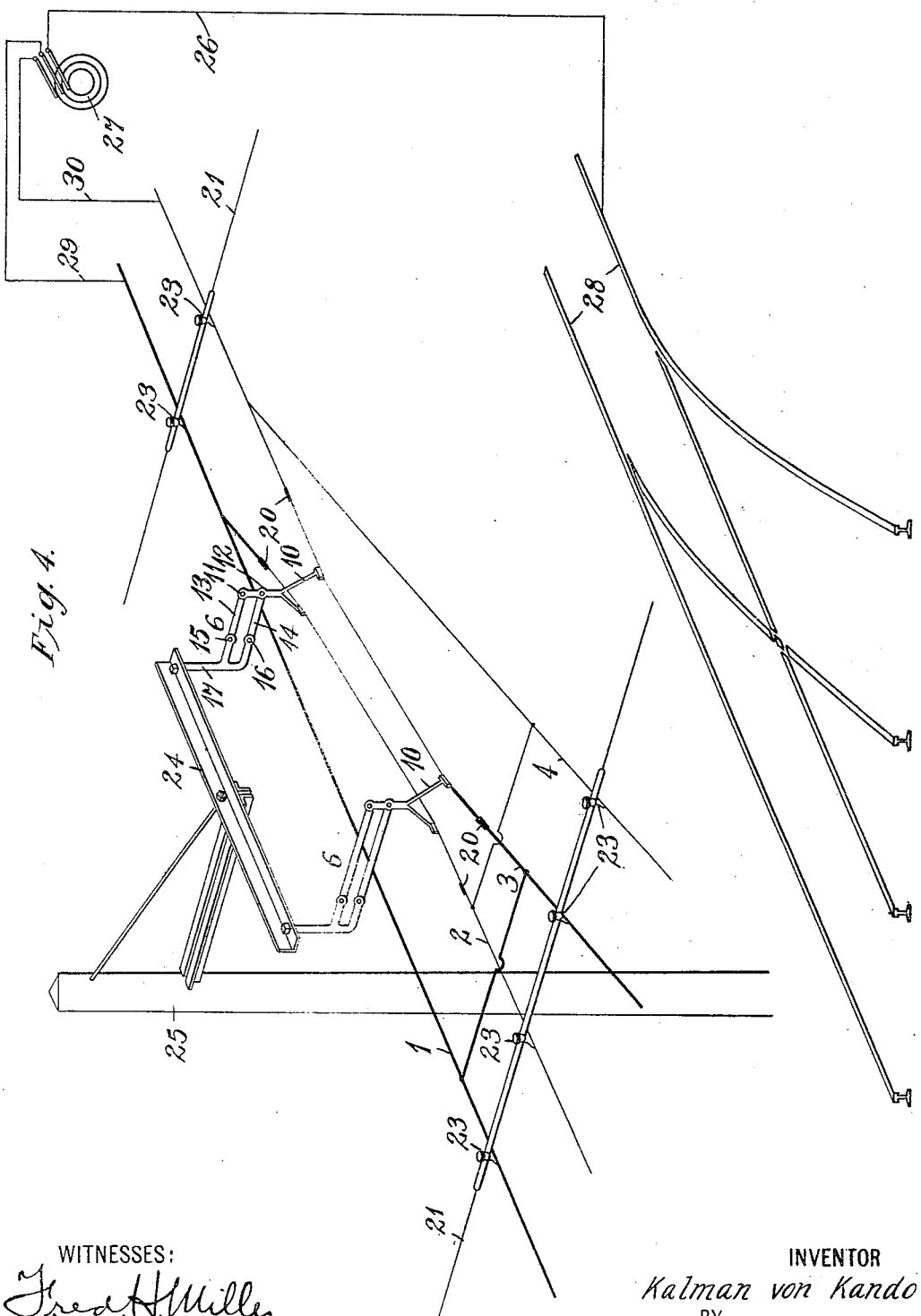

UNITED STATES PATENT OFFICE.

KALMAN VON KANDO, OF VADO LIGURE, ITALY, ASSIGNOR TO GEORGE WESTINGHOUSE.

OVERHEAD-TROLLEY SYSTEM.

946,549.  Specification of Letters Patent.  Patented Jan. 18, 1910.

Application filed May 4, 1908. Serial No. 430,793.

*To all whom it may concern:*

Be it known that I, KALMAN VON KANDO, a subject of the Emperor of Austria-Hungary, and a resident of Vado Ligure, in the Kingdom of Italy, have invented a new and useful Improvement in Overhead - Trolley Systems, of which the following is a specification.

My invention relates to overhead line structures for electric tramways or railways and it has for its object to provide a device for steadying and guiding two of the four trolley wires which meet at a crossing or junction of a double wire overhead system of this class.

It has been suggested, in connection with double wire overhead lines to employ, instead of two separate trolley poles, a single current collector which is made to press against both wires and is provided with an insulator in the middle, so that it can collect currents of different phases or at different potentials. Owing to the upward pressure of the current collector, the wires with which it is in contact are always raised above the normal level, consequently, when a car approaches an overhead junction the wire from which the current collector is taking current is raised higher than the other wire under which the collector should pass. It frequently happens, therefore, that the end of the current collector knocks or catches against the lower wire.

My present invention is intended to avoid this drawback by employing an improved steadying and guiding device, to which both of the inner wires are attached. The action of this device is such that when the current collector raises one wire, it also raises the other wire to the same extent, and, consequently, the end of the current collector is free to pass underneath without catching. Furthermore, the two side supports of the current collector are resiliently connected to the roller or bow so that when one side is loaded with or engaged by both wires the current collector assumes an oblique position, thus insuring that its end is sufficiently low in all cases to pass freely under the other wire.

In the accompanying drawings, Figure 1 is an elevation of a section of overhead line equipped with the improved steadying device of my invention, a current collector being shown in contact with the lines near the crossover. Fig. 2 shows, in perspective, the application of my invention to a double-wire overhead junction. Fig. 3 is a view, similar to Fig. 2, of a single wire trolley system equipped with my invention. Fig. 4 is a diagrammatic perspective view of a section of electric railway which is supplied with three-phase alternating-current energy and is also equipped with my invention.

Referring to the drawings, 1 and 2 are trolley wires of one line and 3 and 4 are the trolley wires of another line which meet at a junction, 5 being a double current collector and 6 parallel motion steadying and guiding devices.

As is usual with three-phase railway distributing circuits, one phase 26 of the generator 27 or other source of energy is connected to the rails 28 and is grounded while the other two phases 29 and 30 are respectively connected to the two overhead trolley wires (see Fig. 4). With this arrangement, the two inner wires at the junction are connected to different phases of the supply circuit and must, consequently, be insulated from each other. For the sake of clearness, the trolley wires of one phase are indicated by means of light lines and those of the other phase are indicated by means of heavy lines.

The wires may be suspended by any suitable means, such as the cross-spans 21 that are secured to poles (not shown) and carry clamps 23 which are fastened to the said wires.

If it is assumed that the steadying and guiding devices 6 are omitted and that the current collector is approaching the crossing 7 on the trolley wires 3 and 4 in the direction of the arrow 8 (see Fig. 2), the current collector, in consequence of the pressure exercised by the same, lifts the trolley wires 3 and 4 above the plane of the wires 1 and 2. The highest point of the current collector is thus always higher than the trolley wire 2, so that the current collector cannot slip beneath the conductor 2, but, on the contrary, knocks against the same or catches under it. The conductor 2 could be, of course, permanently raised at this point, but then the disadvantages would only be avoided when the crossing took place in one direction and the crossing of the wires 1 and 2 in the opposite direction is made worse than before.

When the parallel motion steadying and guiding devices 6 of the present invention are employed, the above mentioned difficulties are obviated, as hereinafter set forth, and, in order to obtain the best results, the current collector is specially adapted for use in conjunction with the overhead line structure.

The two inner wires 2 and 3 of the four trolley wires 1, 2, 3 and 4 which meet at the junction or crossing, are fastened to the steadying devices 6 each of which comprises a common forked support 10 hinged at 11 and 12 to two links 13 and 14 that are pivotally connected at 15 and 16 to a stationary support 17 which, in turn, is fixed to the bracket arm 24 on the pole 25. Any other suitable means may be employed for suspending the trolley wires. A parallelogram of links is thus formed so that the support 10 is always kept vertical and when the current collector raises one of the trolley wires, the wire 3 for example, the other trolley wire 2 which is fixed to the same support 10 is raised the same distance from its normal position. Thus, the current collector, when the device is constructed accurately, can slip under the trolley wire 2. As, however, neither the suspension device nor the current collector can be constructed with complete accuracy, the latter is preferably provided with two side supports 18, (see Fig. 1) to which the current collecting roller or bow is resiliently or yieldingly joined so that the frame will not be rigid. As soon as the current collector begins to raise the movable support 10, that side of the current collector is loaded not only with the weight of the wire 3, but also with that of the second wire 2, and, consequently, this side of the current collector being more heavily loaded than the other, the current collector assumes an oblique position so that its end comes sufficiently low to slip under the wire 2. It will easily be understood that this effect is produced in either direction of travel.

Several of the steadying devices above described may be arranged at one junction, as shown diagrammatically in Figs. 2 and 4, care being taken that the wires 2 and 3 are not electrically connected in any way; this may be done by providing insulators 20 which insulate the actual junction of the wires from the remaining portions thereof.

As shown in Fig. 3 of the drawings, the suspension device 6 is applicable to single wire trolley systems and it is conceivable that various structural modifications may be effected within the spirit and scope of my invention.

I claim as my invention:

1. In an overhead line structure, the combination with two conductors relatively close together and means for suspending the same, of a single yielding device for maintaining a predetermined relative position between the conductors.

2. In an overhead line structure, the combination with two angularly disposed conducting wires and means for suspending the same, of a steadying device comprising a stationary member, a yoke to which the wires are secured and parallel links connecting the yoke and the stationary member.

3. In an overhead line structure, the combination with two intersecting conducting wires, and means for suspending the same, of a yielding device near the junction for keeping the wires in the same horizontal plane.

4. In an overhead line structure, the combination with two angularly disposed groups severally comprising two conducting wires, and means for suspending the same, of yielding device for the adjacent wires of the two groups comprising a stationary member, a yoke secured to the wires and parallel links connecting the yoke to the stationary member.

5. In an overhead line structure, the combination with two angularly disposed groups severally comprising two substantially parallel conducting wires, and means for suspending the same, of means for so steadying and guiding the adjacent wires of the two groups as to maintain a predetermined relation between them.

6. In an overhead line structure, the combination with a conductor and means for suspending the same, of a steadying and guiding device comprising parallel-motion links yieldingly connected to said conductor.

7. In an overhead line structure, the combination with a conductor and means for suspending the same, of a steadying and guiding device therefor comprising a relatively stationary member, a clamp secured to the conductor and a pair of parallel links connecting the clamp to the stationary member.

8. In an overhead line structure, the combination with two conductors relatively close together and means for suspending the conductor, of a steadying and guiding device comprising a yoke secured to the two conductors, an offset stationary member and a pair of parallel links connecting the yoke with the stationary member.

9. In an overhead line structure, the combination with two conductors relatively close together and supporting means therefor, of a steadying and guiding device comprising a member to which the two conductors are rigidly secured, a stationary offset member and a pair of substantially horizontal parallel links which connect the two members and keep the conductors in the same horizontal plane.

KALMAN VON KANDO.

Witnesses:
   ANT. MACALE,
   JULIUS PAVLOVSZKY.